(12) United States Patent
Zafiroglu (10) Patent No.: US 10,337,141 B2
(45) Date of Patent: Jul. 2, 2019

(54) TEXTILE FLOOR-COVERING WITH LIQUID BLOCKING SURFACE

(71) Applicant: TEXTILE FLOORING INTERNATIONAL, LLC, Dalton, GA (US)

(72) Inventor: Dimitri Zafiroglu, Centreville, DE (US)

(73) Assignee: ENGINEERED FLOORS LLC, Dalton, GA (US)

( * ) Notice: Subject to any disclaimer, the term of this patent is extended or adjusted under 35 U.S.C. 154(b) by 638 days.

(21) Appl. No.: 13/886,733

(22) Filed: May 3, 2013

(65) Prior Publication Data

US 2013/0280486 A1 Oct. 24, 2013

Related U.S. Application Data

(63) Continuation-in-part of application No. 13/447,863, filed on Apr. 16, 2012, now Pat. No. 9,243,359.
(Continued)

(51) Int. Cl.
*D06N 7/00* (2006.01)
*B32B 27/12* (2006.01)
(Continued)

(52) U.S. Cl.
CPC .......... *D06N 7/0076* (2013.01); *A47G 27/02* (2013.01); *B32B 7/12* (2013.01); *B32B 27/08* (2013.01);
(Continued)

(58) Field of Classification Search
CPC ............... A47G 27/02; A47G 27/0206; A47G 27/0212; A47G 27/00; B32B 7/12;
(Continued)

(56) References Cited

U.S. PATENT DOCUMENTS 2,688,578 A 9/1954 Teague
3,066,513 A 12/1962 Leybourne
(Continued)

FOREIGN PATENT DOCUMENTS

CA 2320471 A1 3/2001
EP 0590422 A1 4/1994
(Continued)

OTHER PUBLICATIONS

International Search Report and Written Opinion issued in connection to corresponding International Application No. PCT/US2013/035631 dated Aug. 9, 2013.

*Primary Examiner* — Cheryl Juska
(74) *Attorney, Agent, or Firm* — Patent Portfolio Builders PLLC (57) ABSTRACT

A composite floor-covering comprising a fabric face layer, a barrier layer and a cushion backing layer is disclosed. The fabric face layer is attached to the barrier layer by a first adhesive layer and the barrier layer is attached to the cushion backing layer by a second adhesive layer. The fabric face layer on the composite floor covering can stretch up to an initial amount under a first pressure and can stretch beyond under a second pressure wherein the second pressure is higher than the first pressure. The composite floor-covering has a water vapor transmission rate of less than about 5.0 $cm^3/m^2/24$ hour at 100° F. and 90% RH.

9 Claims, 6 Drawing Sheets

Related U.S. Application Data (60) Provisional application No. 61/642,201, filed on May 3, 2012.

(51) Int. Cl.
| | |
|---|---|
| *B32B 7/12* | (2006.01) |
| *A47G 27/02* | (2006.01) |
| *B32B 27/08* | (2006.01) |
| *B32B 27/30* | (2006.01) |
| *B32B 27/32* | (2006.01) |

(52) U.S. Cl.
CPC ............ *B32B 27/12* (2013.01); *B32B 27/304* (2013.01); *B32B 27/306* (2013.01); *B32B 27/32* (2013.01); *D06N 7/0068* (2013.01); *D06N 7/0086* (2013.01); *B32B 2307/7265* (2013.01); *B32B 2471/00* (2013.01); *Y10T 428/23979* (2015.04); *Y10T 428/23993* (2015.04); *Y10T 428/24355* (2015.01); *Y10T 428/249921* (2015.04)

(58) Field of Classification Search
CPC ......... B32B 27/08; B32B 27/12; B32B 27/32; B32B 27/304; B32B 27/306; B32B 2307/7265; B32B 2471/00; D06N 7/0068; D06N 7/0076; D06N 7/0086; Y10T 428/23979; Y10T 428/23993; Y10T 428/249921; Y10T 428/24355
USPC .............................................. 442/79; 428/95
See application file for complete search history.

(56) References Cited

U.S. PATENT DOCUMENTS

| | | | |
|---|---|---|---|
| 3,215,584 A | 11/1965 | McConnell et al. | |
| 3,254,510 A | 6/1966 | Lesley | |
| 3,560,284 A | 2/1971 | Wisotzky | |
| 3,576,701 A | 4/1971 | Salamon et al. | |
| 3,732,708 A | 5/1973 | Troy | |
| 3,985,925 A | 10/1976 | Lefebvre et al. | |
| 4,015,036 A | 3/1977 | Haemer | |
| 4,081,579 A | 3/1978 | Queen et al. | |
| 4,217,383 A | 8/1980 | Patterson et al. | |
| 4,284,507 A | 8/1981 | Beane | |
| 4,360,554 A | 11/1982 | Campbell et al. | |
| 4,406,309 A | 9/1983 | Czelusniak, Jr. | |
| 4,808,459 A | 2/1989 | Smith | |
| 4,975,316 A * | 12/1990 | Romanowski | A41D 31/0027 428/920 |
| 5,192,600 A * | 3/1993 | Pontrelli | D04H 1/52 112/402 |
| 5,558,916 A | 9/1996 | Heim et al. | |
| 5,612,113 A | 3/1997 | Irwin, Sr. | |
| 5,902,663 A | 5/1999 | Justesen et al. | |
| 5,962,101 A | 10/1999 | Irwin, Sr. et al. | |
| 5,965,232 A | 10/1999 | Vinod | |
| 6,045,900 A * | 4/2000 | Haffner | A61F 13/51401 428/315.9 |
| 6,096,668 A * | 8/2000 | Abuto | A61F 13/51462 442/328 |
| 6,132,838 A * | 10/2000 | Hiratsuka | D06M 15/256 427/393.4 |
| 6,162,748 A | 12/2000 | Schilling et al. | |
| 6,269,759 B1 | 8/2001 | Zafiroglu | |
| 6,468,623 B1 | 10/2002 | Higgins | |
| 6,572,965 B1 | 6/2003 | McGee et al. | |
| 6,872,445 B2 | 3/2005 | Vinod | |
| 6,936,327 B2 | 8/2005 | Zafiroglu | |
| 7,122,089 B2 * | 10/2006 | Zafiroglu | B32B 5/26 156/291 |
| 7,247,352 B2 | 7/2007 | Jones, Jr. | |
| 7,255,761 B2 | 8/2007 | Zafiroglu | |
| 7,279,058 B2 | 10/2007 | Morgan | |
| 7,338,698 B1 | 3/2008 | Bieser | |
| 7,425,359 B2 * | 9/2008 | Zafiroglu | B32B 3/28 428/131 |
| 7,431,975 B2 * | 10/2008 | Zafiroglu | B32B 3/28 156/297 |
| 7,497,878 B2 * | 3/2009 | Lagrange | A61Q 5/065 548/152 |
| 7,497,978 B2 | 3/2009 | Zafiroglu | |
| 7,622,408 B2 * | 11/2009 | Zafiroglu | B32B 5/02 156/148 |
| 7,803,446 B2 | 9/2010 | Martz | |
| 8,216,659 B2 | 7/2012 | Zafiroglu | |
| 2003/0070739 A1 * | 4/2003 | Zafiroglu | D04B 21/02 156/93 |
| 2004/0071927 A1 | 4/2004 | Murphy et al. | |
| 2004/0106345 A1 * | 6/2004 | Zafiroglu | B32B 3/28 442/149 |
| 2004/0106346 A1 * | 6/2004 | Zafiroglu | B32B 3/28 442/149 |
| 2004/0247821 A1 * | 12/2004 | Zafiroglu | B32B 5/26 428/88 |
| 2005/0003141 A1 * | 1/2005 | Zafiroglu | B32B 5/02 428/92 |
| 2006/0105664 A1 * | 5/2006 | Zafiroglu | B32B 5/02 442/402 |
| 2006/0240217 A1 | 10/2006 | Foss et al. | |
| 2006/0240247 A1 | 10/2006 | Haller | |
| 2006/0280902 A1 | 12/2006 | Otteson et al. | |
| 2009/0047465 A1 * | 2/2009 | Zafiroglu | B29C 43/222 428/97 |
| 2009/0061061 A1 * | 3/2009 | Beckwith | A23L 3/3436 426/546 |
| 2009/0123688 A1 | 5/2009 | Miller et al. | |
| 2010/0279057 A1 | 11/2010 | Zafiroglu | |
| 2013/0273297 A1 * | 10/2013 | Zafiroglu | B32B 7/02 428/76 |

FOREIGN PATENT DOCUMENTS

| | | |
|---|---|---|
| GB | 1180342 A | 2/1970 |
| WO | 98/38374 A2 | 9/1998 |
| WO | 99/19557 A1 | 4/1999 |
| WO | 00/09798 A1 | 2/2000 |
| WO | 01/27382 A1 | 4/2001 |
| WO | 2006/135695 A2 | 12/2006 |

\* cited by examiner

FIG. 1

Fig. 2
*Conventional*

TEXTILE FLOOR-COVERING WITH LIQUID BLOCKING SURFACE

CROSS-REFERENCE TO RELATED APPLICATIONS

This present application claims priority under 35 U.S.C. § 119(e) to U.S. provisional application Ser. No. 61/642,201, entitled "Textile Floor-Covering with Liquid Blocking Surface," and filed on 3 May 2012. The present application also claims priority under 35 U.S.C. § 120 as a continuation-in-part of U.S. patent application Ser. No. 13/447,863 entitled "Fabric-Faced Floor Coverings with Micro-Spring Face Structures" filed on Apr. 16, 2012, which issued as U.S. Pat. No. 9,243,359 on Jan. 26, 2016. The parent applications are incorporated herein by reference in their entireties.

BACKGROUND

Floor-coverings with dense solid surfaces such as ceramic, wood, vinyl, rubber or urethane are generally durable, and can effectively contain liquid spills at or near the surface, but offer little or no cushion. These solid floor-coverings also lack the aesthetics and surface softness of textile/fibrous floor-coverings. Textile floor-coverings, on the other hand, lack the capability to contain liquid spills at the surface. In institutional applications, such as hospitals, office buildings, restaurants, schools, retirement homes and the like, it is highly desirable to combine the soft and cushioning surface of the textile floor-coverings with the superior spill-containing capability of solid floor-coverings. Additionally, the capability to resist the impact of liquids dropped from substantial heights such as 1 meter, and to hold the spills at the surface or within a very small depth beneath the surface, for long periods of time, to facilitate clean-up is also desirable.

Figure 1:
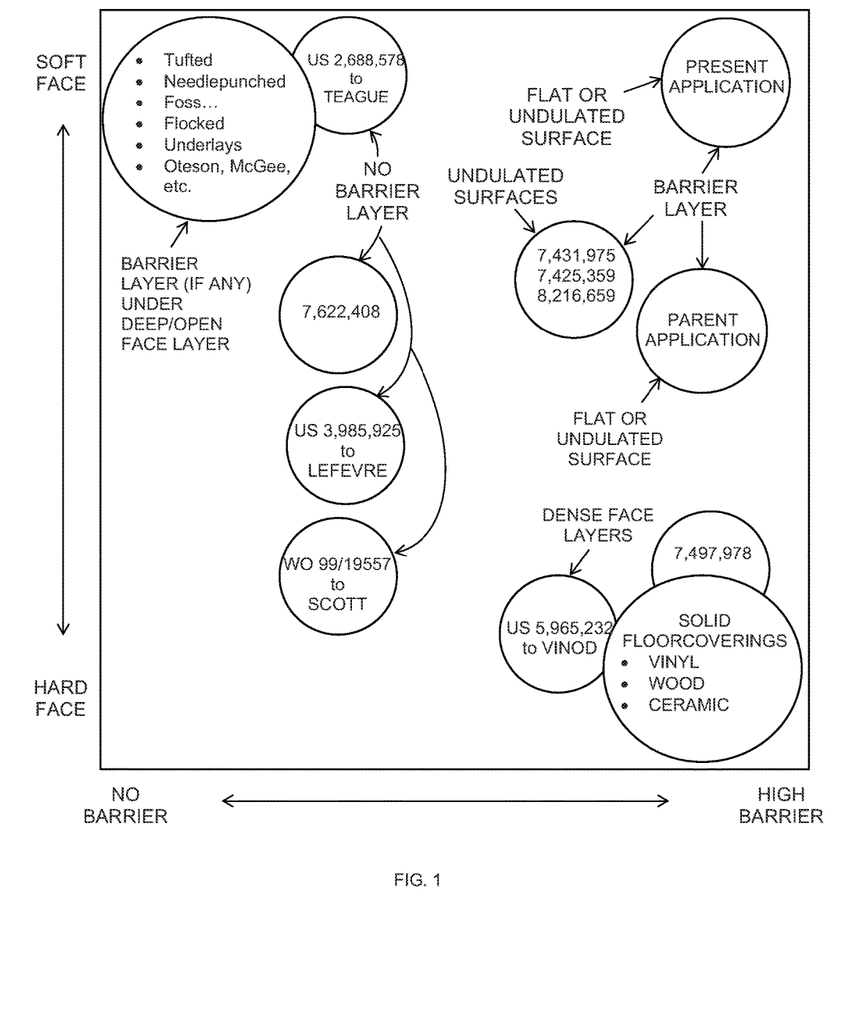
FIG. 1 compares the barrier and face softness of various floor-coverings in a diagrammatic form.

FIG. 1 is a diagrammatic chart of the surface barrier and surface softness of various floor-coverings. Solid floor-coverings with superior barrier and hard surfaces are located at the lower right-hand corner of the chart. Textile faced floor-coverings with open, deep and soft cushioning face layers, such as pile structures, are located at the opposite upper-left hand corner. Desirable institutional floor-coverings, that would combine both of the attributes of superior barrier and soft surface, are assigned to the right hand upper corner.

Figure 2:
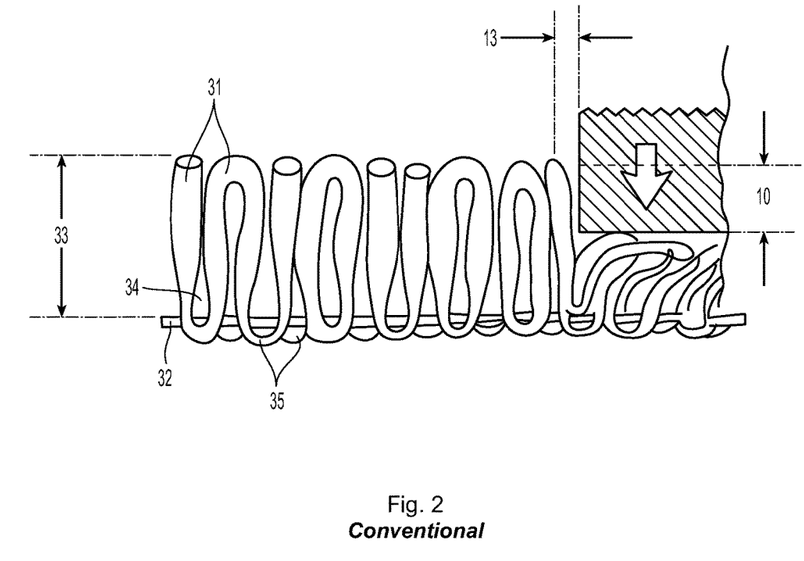
FIG. 2 illustrates a conventional pile floor-covering having a deep and soft pile textile surface.

The first and most common type of conventional textile floor-coverings, grouped at the upper left-hand corner of FIG. 1, provides cushion with a relatively deep, open, and soft textile face layer. The face layer preferably comprises a "pile" of upstanding yarns 31, secured by a primary backing 32, as shown in FIG. 2. The face layer is optionally treated with repellent finishes. Pile structures, and especially looped-yarn piles and relatively closely-spaced piles, can maintain their facial appearance better than "nonwoven" structures, wherein individual fibers oriented in all directions are subject to bending or deforming as they individually absorb stress during use. Yarns also offer color and design capabilities, especially with pigment-colored yarns that can resist chemical cleaning. Piles offer "face softness" which is low resistance to initial light compression. Light pressure depresses the area of contact making a temporary local indentation, without spreading the load sidewise or in the planar direction, as illustrated in FIG. 2. Unfortunately, the openness of the pile makes it incapable of blocking spills from propagating through depth 33 to the bottom 34, even when the piles are formed with repellent fibers or treated with repellent polymers. Especially spills that fall from higher heights, such as 40 inches or 1 meter, which can occur frequently, tend to follow the path of the yarns through and beyond primary backing 32, to the backlaps 35, and on towards the floor underneath, and to soak the primary backing. Pile carpets are very difficult to clean, and in situations where the spills involve decomposable organics such as food, blood or urine and the like, they create chronic odor problems. Spills that occur from smaller heights may temporarily stay above the face layer, allowing time for quick response to the spills, but within seconds or minutes break through to the bottom of the face layer, with or without subsequent surface contact such as light hand-patting or stepping on the spill. Furthermore, repellent treatments tend to wear out with traffic or multiple cleanings, further reducing the short time available to react to a spill. To protect the underlying floor liquid-blocking sub-layers have occasionally been added to the underside of formed carpets as disclosed in EP 0590422/B1 to Goss, U.S. Pat. No. 5,612,113 to Irwin, U.S. Pat. No. 7,247,352B2 to Jones Jr., U.S. Pat. No. 7,803,446 B2 to Martz, and EP 0963476 to Bieser, among others. Details of barrier performance are not discussed. EP 1112406B to Jenkines discloses aqueous polyurethane dispersions, applied to the backside of pile carpets, and designed to limit the propagation of spills that reach the bottom 34 of the pile.

As secondary protection for the floor, under-pads, variously called "carpet pad" or "carpet underlayment" or "carpet cushion", are deployed under carpets or rugs, are optionally equipped with barrier layers. Examples of such under-pads are discussed in US 2006/0280902 to Otteson et al., U.S. Pat. No. 6,572,965B1 to McGee, U.S. Pat. No. 6,872,445 to Vinod, US 2004/0071927 to Murphy, CA 2,320,471 to Denney, U.S. Pat. No. 5,541,849 to Collins, EP 1907622A2 by Butenschoen, U.S. Pat. No. 7,279,058 to Morgan, EP 1232301 A1 to Huffines, U.S. Pat. No. 4,360,554 to Campbell, U.S. Pat. No. 5,032,705 to Rose and US 2009/0123688 by Miller, among many others. The under-pads only protect the floor underneath by not allowing the liquids which have already penetrated the whole overlaid floor-covering from reaching the floor. They do not provide a durable surface suitable to use directly as a floor-covering. In FIG. 1 they are also placed at the upper left hand corner.

In a second type of durable textile-faced floor-coverings, most or all of the cushion is provided by a low-bulk cushioning backing attached underneath a much thinner fibrous/textile face fabric. These floor-coverings can provide textile aesthetics, relative cushion and high durability if the face fabric itself is durable, and securely attached to the cushion to resist delamination. They generally do not offer spill-blocking resistance. Spills are likely to proceed into the deeper soft backing, and on to the floor underneath. They include U.S. Pat. No. 3,985,925 to Lefevbre, WO99/19557 to Scott, U.S. Pat. No. 2,688,578 to Teague, and U.S. Pat. No. 7,622,408 to the present inventor, among others. The Teague reference notably discloses a highly-elastic face layer attached to an elastic cushioning backing providing a soft face analogous to the structures in the upper left hand corner of FIG. 1. The remaining references disclose progressively denser and stiffer face layers placing them progressively lower under Teague in FIG. 1. The Scott reference is placed lowest, as it includes a stiff reinforcing sub-layer under the face fabric.

U.S. Pat. No. 5,965,232 to Vinod discloses a highly-reinforced composite floor-covering using a textile face fabric, which is coated with repellent polymers, and attached to a "reinforcing or stabilizing layer" having "good stabilizing properties". The reinforcing layer is designed "to provide dimensional stability", to "improve adhesion" and "to provide resistance against puncture and wear". No mention is made of delamination resistance. An optional cushion layer may be attached to the bottom of the stabilizing layer with permanent or temporary means such as "pressure sensitive" adhesives or mechanical means, such as "hook and loop". A measure of liquid penetration resistance is achieved by "combining the layers in a manner rendering the composite substantially impervious to liquids". A preferred reinforcing layer is a highly stable and inextensible "scrim" of "woven or cross-laid glass yarns". To test resistance to liquid penetration 20 mg of tinted water is dropped from a height of 6 cm onto the composite and "worked-in to produce a uniform stain". Resistance is judged sufficient if the composite allows no liquid or only a minimum amount of liquid to pass through all the way to the backside of the cushion layer and does not stain or slightly stains a blotting sheet placed underneath within 30 minutes. In addition to this limited resistance to liquid blocking, the presence of a reinforcing layer that is required to increase dimensional stability and puncture and wear resistance will necessarily increase surface stiffness, reduce cushion, and detract from the soft textile hand. Relying upon "the manner of combining" layers to partially or totally block liquid, rather than providing a flexible separate layer that blocks liquids by itself, is also likely to require the selection of particularly stiff reinforcements such as glass, and/or large amounts of adhesives to fill-in pores, excluding the possibility of maintaining a soft and compliant face structure. Vinod is placed adjacent to solid floor-coverings in FIG. 1.

U.S. Pat. No. 7,497,978 by the current inventor discloses needle-punched structures with polymer-rich densified faces that can block liquids at the surface. The stiffness of the face layers places this reference close to solid floor-coverings in FIG. 1.

U.S. Pat. Nos. 7,425,359, 7,431,975, and 8,216,659, all by the current inventor, disclose composite floor-coverings with thin textile face layers attached to a relatively deep cushioning backing. Melt-blown nonwovens or the adhesive layers are given as examples of barrier layers. The surfaces are textured or undulated by embossing with heat and pressure. While these patents disclose improved floor covering products, liquid barrier is considered adequate if a column of water 10 inches high fails to penetrate through to the bottom of the entire composite within 30 minutes. With more rigorous testing, such as water dropped from a height of 1 meter, they exhibit limited and variable barrier performance, partly due to the tendency for the barrier layers under the depressed areas to be thinned-out during the application of laminating/embossing pressure and develop leaks. In FIG. 1 these references are placed above solid floor-coverings because of their relative softness, but below the level of ideal high-impact barrier.

In summary, prior art does not disclose durable textile-faced floor-coverings that could be placed at the upper right-hand corner of FIG. 1, offering a soft textile surface equivalent to commercial or institutional pile cushioning structures, and being simultaneously capable of containing liquids dropped with high impact, for long periods of time, either at the surface or within a thin face layer that can easily be cleaned to avoid bacterial growth.

SUMMARY OF THE INVENTION

This invention provides fibrous faced floor-coverings offering durability and soft face cushion equivalent to industrial/commercial/institutional textile flooring, and simultaneously limiting fluid penetration to a thin fibrous face layer for at least 24 hours, even with spills occurring from a height of up to 1 meter. The floor-coverings are recoverably compressible, beyond the limited depth of the thin face layer under a low compression force, around 25 psi. They also have a delamination resistance above 1,000 grams/cm, to ensure durability. Preferably the floor-coverings have a Vetterman Drum test rating above 2.5, more preferably above 3.5.

The inventive floor-coverings comprise a fibrous thin face layer with a flat undersurface, specially selected to stretch initially with low stress and tighten as it is stretched further. The face layer comprises yarns that form and cover its two surfaces. The composites also comprise a special highly-extensible barrier layer capable of containing fluids dropped from 1 meter for 24 hours. They also comprise a deep low-density resilient cushion backing layer. The barrier layer is capable of stretching up to 50% and preferably stretching by 25 to 50% without losing its liquid-blocking properties. The three layers are laminated in a flat configuration with low pressure so that high delamination resistance can be achieved without compromising the integrity of the barrier layer. The cushion layer is porous to allow moisture to escape from the underlying floor.

Any and all of the layers forming the inventive composite may be optionally constructed with repellent materials or treated with repellent finishes. If the face layer is constructed with repellent materials or treated with repellents, spilled liquids uniquely penetrate the shallow face layer only down to the barrier layer and only at the area of impact, but beyond the area of impact they would remain on the surface for longer than 24 hours. If the face layer is not repellent, fluids will spread out around the area of impact but would remain above the barrier layer.

DETAILED DESCRIPTION

The present invention is directed to floor-coverings that comprise an integral and separate barrier layer, capable of stopping liquids dropped from higher heights, and not penetrated or deformed by the overlying or underlying fibers or yarns. This separate barrier layer is securely attached to a face layer positioned above it and to a backing or cushioning layer below it by adhesive layers. In one embodiment, the inventive floor-covering is a composite comprising at least a face layer, a first adhesive layer, a barrier layer, a second adhesive layer and a backing layer. The face layer is a fabric that preferably restricts the amount of local stretch or strain on the floor-covering when localized heavy loads such as furniture and footsteps are applied to the floor-covering. The barrier layer provides a predetermined low water vapor transmission rate to prevent water from penetrating to the flooring below the floor-covering but allows gases, such as water vapor or oxygen, to permeate from the flooring through the floor-covering to vent. Such barrier layers, as discovered by the present inventor, are susceptible to being damaged by localized loads. Localized loads can stretch the barrier layer to the breaking point where water or other liquids can penetrate through. In the present invention, the face layer provides the structure to limit the amount of stretch experienced by the barrier layer thereby protecting the barrier from localized loads.

Parent U.S. patent application Ser. No. 13/447,863 discloses floor-coverings targeted for modular or tile applications, comprising thin spring-like slightly textured face fabrics, self-supported without primary backings. The fabrics are attached to deep cushioning backings using porous and compressible intermediate adhesive layers. The composites are capable of planar/lateral compression called "face-gather", to prevent warping due to changes in temperature or humidity. The stretch characteristics of the face fabrics prior to lamination are not necessarily controlled. To avoid high friction against traffic the stretch of the face of the composite is controlled to a minimum by adjusting the depth and density of the properties of the strata penetrated by adhesive. When the face of the composite is pulled laterally by a distance equal to the depth of the backing layer it stretches less than 10%.

A barrier layer as shown in the parent application, surrounded by additional porous adhesive, may be added between the face fabric and the backing, and it may be capable of containing liquids dropped from 1 meter. The physical properties of the barrier layer, the effect of the barrier layer on surface-softness or vertical surface-compressibility, and the effect of repetitive compression encountered with traffic on barrier performance are not discussed in the parent application. Process conditions that would allow the optional formation of textured/embossed or undulated composite surfaces without affecting barrier integrity are also not discussed. In FIG. 1, this parent application is placed below U.S. Pat. Nos. 7,425,359, 7,431,975, and 8,216,659 by the current inventor.

The physical properties of the barrier layer and the entire composite, and the process conditions for the inventive floor covering without negatively affecting the integrity and functions of the barrier layer are discussed herein.

Figure 3:
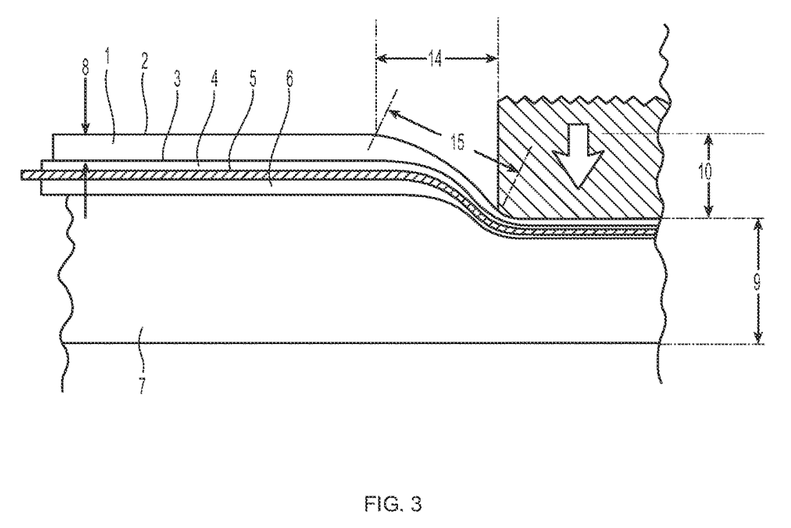
FIG. 3 illustrates a composite floor-covering of the present invention having a textile face layer that can be extended with low stress before tightening, attached to an extensible barrier layer, and in turn attached to a compressible cushion layer underneath.

FIG. 3 shows a generalized form of the present invention, with face fabric 1 having a smooth upper face 2 and smooth lower face 3 attached to barrier layer 5 with adhesive layer 4, and to cushion layer 7, with adhesive layer 6. The composite can be recoverably compressed under a pressure of approximately 25 psi by depth 10 exceeding thickness 8 of face layer 1. Thickness 8 is preferably limited to approximately 2 mm (0.08 inches), and more preferably to 1.5 mm (0.060 inches), and it is also smaller than one third and preferably smaller than one quarter of thickness 9 of the entire composite. Spilled fluids descending with high impact from levels up to one meter can penetrate only through thickness 8 down to barrier layer 5. The peel resistance of the composite exceeds 1,000 g/cm.

Achieving textile cushion similar to deep faced piles, as well as peel resistance and durable barrier, requires that the combined face and barrier layers and the surface of the backing layer can flex down under the weight of traffic. Flexing of the surface involves deformation around the compressed area extending out by a horizontal distance 14, as shown in FIG. 3, and the temporary stretching of the combined face layer, barrier layer and the upper part of the cushion layer approximately from horizontal dimension 14 to diagonal dimension 15. In the case of the open and deep cushioning pile layers of prior art shown in FIG. 2, no surface stretch needs to occur as the pile fibers under compression simply collapse and separate from the rest of the piles. Distance 13 of FIG. 2, the equivalent of distance 14 of FIG. 3, is practically zero.

The present inventor observed that barrier layers with very high stretch capability, beyond the levels of stretch caused by surface compression during use shown in FIG. 3, are advantageous in preserving barrier properties or integrity. It is hypothesized that this may be due to the non-uniformity of stress along the laminated barrier on a microscopic scale. The yarns within the fibrous face layer and the fibers or cells within the fibrous or porous cushion layer are mostly non-planar. A large portion of the planar stress within these two layers is absorbed by the shifting of yarns, fibers or cells. The barrier layer is planar and can be substantially homogeneous, and the barrier layer absorbs planar stress directly. Any stress concentration as the composite is compressed during use can result in excessive local strain damaging the barrier. Furthermore, if the barrier is porous or non-homogeneous, concentrated stress can open up or expand pores increasing the damage.

The present inventor further observed that during the testing of resistance to liquid penetration relatively small amounts of fluid, such as 100 ml of water dropped from relatively large heights such as one meter, can breach commonly-used floor-covering barrier layers that can ordinarily block large amounts of fluid accumulated above them. Prior art offers many porous barriers such as nonwoven sheets of melt-blown or flash-spun microfibers, microporous films or membranes, and textile sheets coated or impregnated or reinforced with various resins. They can hold hydrostatic "hydrohead" pressures of 6-20 inches (15.24 cm to 50.8 cm) of water or more, beyond any depth of fluid accumulation that can be encountered on a floor, and they can perform well even after some flexing and stretching. However, unless the barrier is solid or very dense and free of fibers, voids or other elements that could span the thickness of the barrier layer, spilled fluids that impact the floor-covering from large heights tend to find escape paths and breach through within the impact area. Any spill initially blocked by the barrier that has collected over or around the impact area tends to eventually seep through the impacted area to the back side or bottom of the conventional floor-covering.

The present inventor also observed that preserving the properties or integrity of the barrier layer during lamination requires that lamination is performed with the face, barrier, and backing layers in a flat configuration, using soft adhesives that melt and flow or set at temperatures lower than the melting or deformation temperatures of the barrier layer, face layer and backing.

Figure 4:
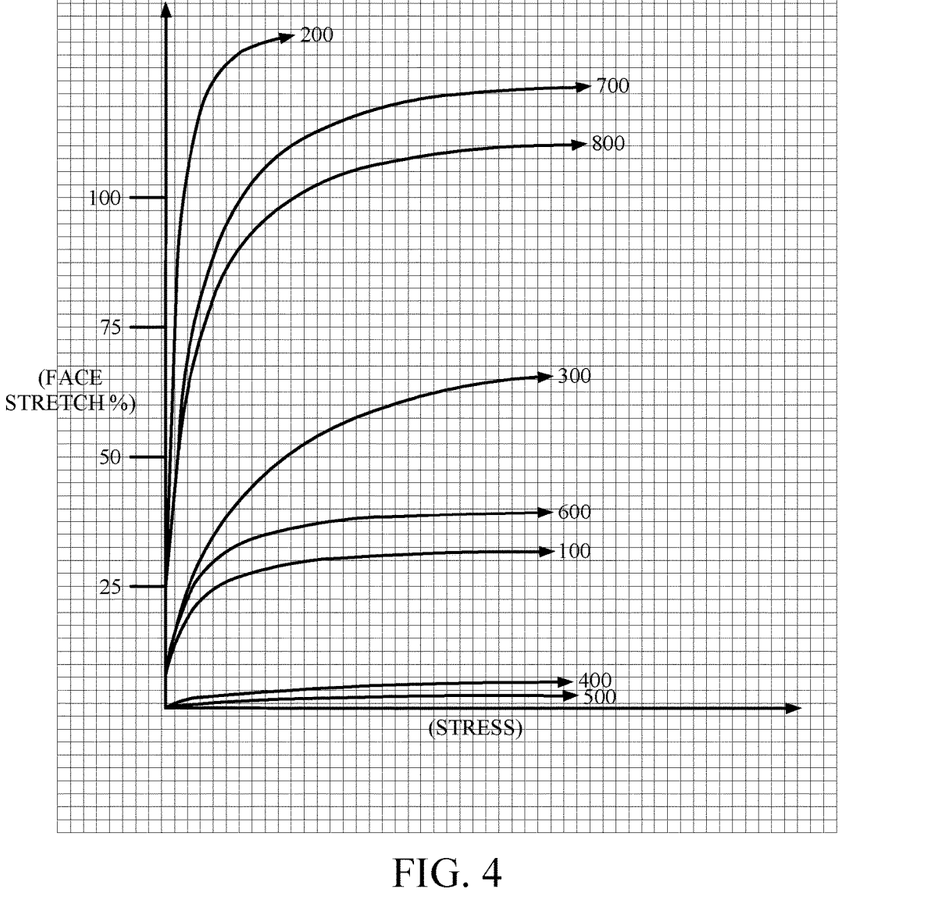
FIG. 4 illustrates the stress-strain characteristics of various layers and composites in a diagrammatic form.

FIG. 4 is a generalized diagrammatic illustration of the relative positions the planar stress-strain curves of various floor-coverings components. Curve 100 represents the desirable early soft stretch and subsequent tightening of the face of the inventive composite. Initial stretch, up to about 10% or up to about 25% requires minimum force, and the curve rises very close to the vertical axis. Above this initial stretch, the face layer tightens and the curve rapidly reaches an essentially horizontal direction. This type of face stretch, simulating the performance of shallower and denser piles, is sufficient for commercial/institutional purposes, as opposed to deeper pile carpets used mostly for residential applications and represented by curve 200, which open up at the surface as depicted in FIG. 2. Curve 200 essentially lines up with the vertical axis. Curve 300 represents the face stretch of a composite such as that disclosed by U.S. Pat. No. 2,668,578 to Teague, simulating soft deep piles at the initial stages of stretch. Curve 400 represents the faces of highly reinforced composites of prior art floor-coverings, such as WO99/19557 to Scott, U.S. Pat. No. 5,965,232 to Vinod and U.S. Pat. No. 7,497,978 to the present inventor, which follow a path close to THAT OF the faces of solid floor-coverings represented by curve type 500, near the horizontal axis.

To obtain the desirable stress-strain curve 100 this invention combines a fabric with a stress-strain curve 600 having a soft initial stretch and tightening after a stretch OF 15-25%, with a specially-selected barrier layer having stress-strain curve type 700, that can easily stretch above 25%, in the range of 50-100% and beyond, without damage, and a backing 800 that has a soft surface stretchable with very low stress. As the three components are combined with the adhesive layers, the face tightens after a limited level of stretch resulting in a face stretch illustrated by curve 100.

In summary recoverable soft surface stretch without loss of barrier is arranged by combining in a flat and planar configuration:
- a face layer that can stretch with low stress, up to approximately 10 or approximately 25%, and tightens quickly after reaching that level.
- a homogeneous and essentially flat barrier layer that can stretch significantly beyond 25% and preferably about 50 or about 100% without losing its barrier properties,
- soft adhesives that melt or set at significantly lower temperatures than the melting points of the other components, flow under very low pressure, and have high affinity for the face, barrier, and cushion layers,
- a cushion layer with a surface that can also stretch in a similar manner to the barrier layer,
- wherein the barrier layer is held substantially flat and unchanged during lamination.

Barrier layers that can stretch significantly more 25%, preferably in the range of 50-100%, without losing barrier properties, and the process that allows integration with the face and backing layers leaving the barrier layer essentially intact are provided BY the present invention. Suitable barrier layers include soft polymeric films, such as polyvinylidene chloride (PVDC), polyolefins, polyesters, or polyurethanes that can stretch and may or may not necessarily recover from high stretch on their own. Soft adhesives with high affinity to the barrier films are also preferred to achieve adhesion with high delamination resistance without damaging the barrier layer. Fillers such as chalk, ash or fire-retardant powders and similar components are also preferably avoided as they tend to change the stretch-strain curve and decrease the capability to stretch without damage.

Preferred materials for the barrier layer include polyvinylidene chloride (PVDC), commercially available from DOW Chemical as Saran® wraps or PVDC co-extruded with a top and bottom layer of polyethylene or polyethylene-vinylacetate commercially available as Saranex®. The co-extruded PVDC is more preferred, because the top and bottom layers provide additional structural support and render the co-extruded film more amenable to heat and/or pressure bonding and more amenable to laminating at lower pressure.

Suitable materials for the barrier layer can be defined by its transmission rate to water vapor and oxygen, as well as its elongation before break. The water vapor transmission rate indicates the film's ability to block liquid and the oxygen transmission rate indicates the film's ability to allow gas from the floor or cushion layer to escape or vent through the film. The Table 1 below illustrates these properties.

TABLE 1

| Saranex® grade | Thickness (mil) | Elongation at Break MD (%) | Elongation at Break TD (%) | Oxygen Transmission Rate ($cm^3/m^2/24$ hr) @ 73° F. and 50% RH | Water Vapor Transmission Rate ($cm^3/m^2/24$ hr) @ 100° F. and 90% RH |
|---|---|---|---|---|---|
| 456 | 6 | 700 | 700 | 1.4 | 0.78 |
| 553 | 3 | 440 | 510 | 4.3 | 2.9 |
| 23P | 2 | 370 | 510 | 12 | 3.9 |
| 14P | 2 | 440 | 520 | 5.4 | 4.5 |
| 451 | 1.5 | 400 | 440 | 7.8 | 5.1 |
| 450 | 1.0 | 400 | 550 | 0.33† | 0.14†† |

†$cm^3 \cdot mm/m^2/atm/24$ hr
††$g \cdot mm/m^2/atm/24$ hr

Preferably, the barrier material should have a water vapor transmission rate of less than about 5.0, preferably less than about 4.0, more preferably less than about 3.5 or 3.0 ($cm^3/m^2/24$ hr) @ 100° F. and 90% RH, and an oxygen transmission rate of at least 1.5, preferably at least 3.0, more preferably 4.0 or 5.0 ($cm^3/m^2/24$ hr) @ 73° F. and 50% RH. While the above table illustrates that the elongation of these suitable materials exceed 400%, the present inventor determines that stretching up to 50% and possibly up to 100% is acceptable without losing barrier properties. Other barrier materials, such as polyurethane or polyolefins, and other film thicknesses can be used (e.g., 10 mil layer of polyurethane), so long as the water vapor transmission rate, oxygen transmission rate and stretch without losing barrier properties stated herein are met. Since the face fabric, with the adhesive layers being pressed into the fabric or backing, and the backing itself are porous, or at least significantly more porous than the barrier layer, the water vapor transmission rate and the oxygen transmission rate of the barrier layer are substantially the same as those of the entire composite floor-covering.

Face layers that will allow soft and recoverable stretch at low levels of strain and will then tighten or "lock" when they reach approximately 25% stretch, are the second feature of this invention. They include selected knit, stitch-bonded, or woven fabrics, designed and finished specifically to acquire a stress-strain curve similar to curve type 600 in FIG. 4. Face layers formed with continuous-filament or staple yarns in the range of 100-1,000 dtex forming thin slightly textured fabrics with looping yarns, similar to some of the fabrics described in parent application Ser. No. 13/447,863, are preferred to nonwovens built with individual fibers, because of their superior durability, effective cushion, more predictable control of the stress-strain curve, and aesthetic design capabilities using pre-colored yarns. Face layer thickness prior to lamination ranges between 1.0 and 2.5 mm, and density between 0.1 and 0.5 gram/cm³.

Since the barrier layer is selected to have very high stretch capability, and the backing layer is selected to co-operate with the upper structure, the stretch capability of the face layer is substantially similar to that of the entire composite floor-covering. In one embodiment, the fabric face layer, while being attached to the composite floor covering, can stretch up to an initial amount discussed above, up to about 10% or up to about 25%, under a first pressure and can stretch beyond this initial amount under a second pressure wherein the second pressure is higher than the first pressure. Preferably, the second pressure is at least 33% more than the first pressure, more preferably at least about 67% and more preferably at least about 100%. This stretch including the initial stretch can be measured by distance 15 as compared to distance 14, as shown in FIG. 3.

Face layers such as the conformable planar fabrics disclosed in U.S. Pat. Nos. 7,425,359, 7,431,975, 6,936,327, 7,255,761 and 8,216,659 to the present inventor are also suitable for the present invention. These references are incorporated herein by reference in their entirety. Specifically excluded from one embodiment of the face layers are tufted or pile carpets/floor-coverings, such as those illustrated in FIG. 2. Also excluded from this embodiment are any face layers that have yarns that are substantially perpendicular to the backing layer.

Backings exhibiting face-stretch properties similar to the face fabrics, and also allowing compression for cushion are a central feature of this invention. They include needle-punched felts which may or may not be additionally bonded with thermoplastic or thermoset adhesives, air-laid or carded and lapped/bonded structures, and foamed materials which may also contain short fibers or fibrids. Their thickness before lamination ranges between 4.0 and 10.0 mm (0.10 to 0.40 inches) and density between 0.05 and 0.25 gram/cm³. Backings or cushion layers disclosed in the patent references discussed in the previous paragraph are also suitable for the present invention.

Figure 5:
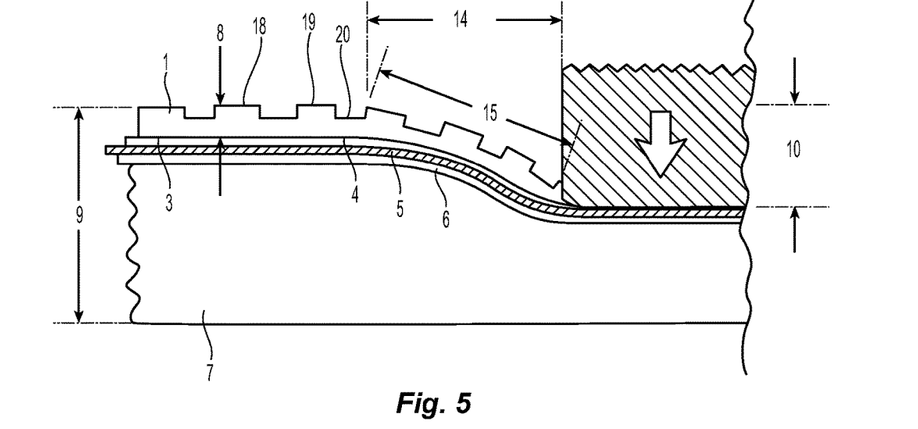
FIG. 5 illustrates a floor-covering composite of the present invention having a contoured/textured textile top surface and a flat under-face.
Figure 6:
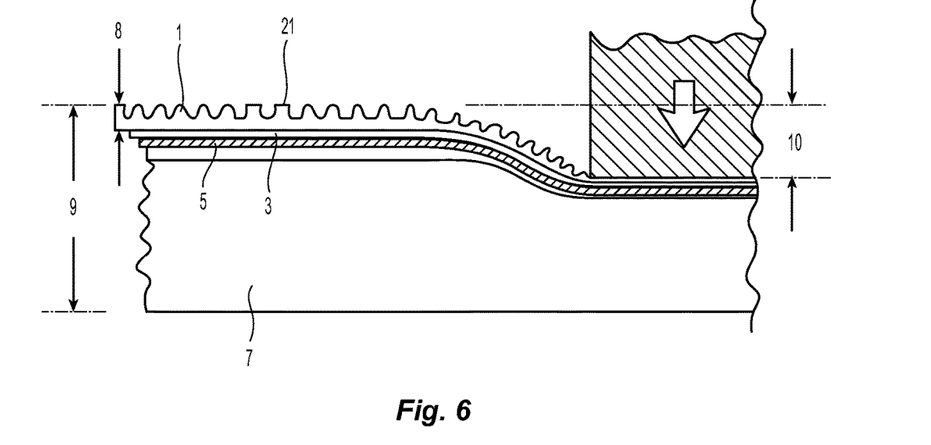
FIG. 6 illustrates a floor-covering of the present invention having a smaller-scale textured surface.

FIG. 5 illustrates an embodiment of the present invention wherein the top surface 18 of face layer 1 is contoured or textured, whereas the interfaces between all layers are substantially flat or planar. Preferably, the adhesive layers flow or set at low temperatures and pressures, so that the relatively small difference in lamination pressure between elevated areas 19 and depressed areas 20 does not cause failure within the barrier layer 5. In the case of solid thermoplastic adhesive layers the melting temperature is chosen to be substantially lower than the melting temperature of the rest of the composite, and the melt viscosity to be as low as possible. Liquid adhesives with low viscosity that set at low temperatures can also be particularly useful. The contouring of face layer 1 may be produced by pre-embossing layer 1 before lamination. Alternately face layer 1 may be a fabric formed by weaving, knitting or any other method with one contoured/textured face and one flat face. Also, as illustrated in FIG. 6, if the texture on the top surface 21 is of a relatively small scale, embossing and lamination may be carried our simultaneously without damaging the barrier layer.

Figure 7:
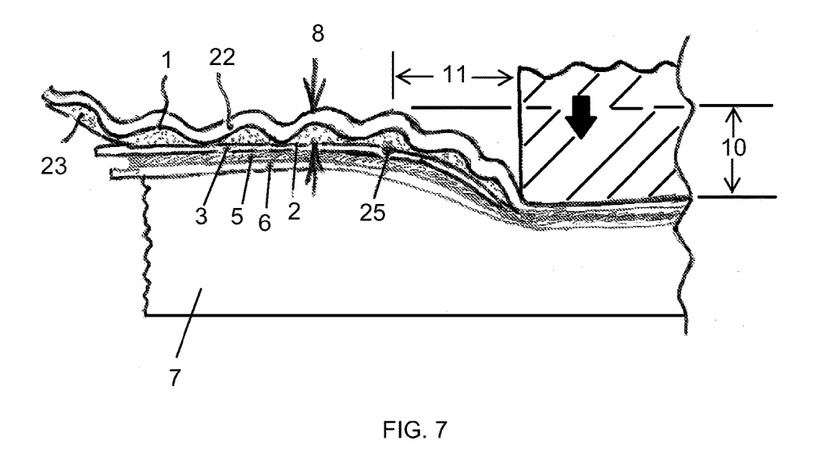
FIG. 7 illustrates a floor-covering of the present invention having a composite face layer with a highly textured undulating top surface with a filled underside presenting a flat surface to the barrier and backing layers attached underneath.

FIG. 7 illustrates another embodiment wherein the face layer 1 has a coarser and deeper surface texture produced by pre-embossing a fibrous layer to produce an undulating surface layer 22, and subsequently filling-in the backside voids 23 with fibers or foam or fibrids or adhesives or combinations, to produce flat backface 25, followed by lamination to a barrier layer and cushion using the same precautions as those which apply to the constructions of FIGS. 4 and 5.

EXAMPLES

TABLE 2 compares examples of the present invention to conventional floor-coverings. The examples demonstrate that the inventive floor-coverings, which comprises a thin barrier layer laminated between a fibrous fabric face layer and a cushioning backing with adhesive layers, effectively blocks liquids, without discernibly affecting the physical properties of the composite. The examples also demonstrate that liquids do not breach the barrier layer even when they are dropped from a height of 1 meter. Spills are blocked from proceeding into the backing and to the subfloor with or without prior repellent treatment on the face layer. The examples further demonstrate that the composites of this invention preserve "surface softness" and allow recoverable downward deformation under low pressures exceeding the depth to which spilled liquids can proceed. It further demonstrates that stiff surface reinforcement, such as those used in the prior art, limits surface compressibility and cushion, and may negatively affect barrier performance. Finally, the examples uniquely demonstrate that, if the face fabric layer on top of the barrier is optionally treated with a liquid repellent, fluids dropped with high impact proceed to the barrier layer only at the impact area, whereas fluids collected on the surface around the impact area remain above the surface for 24 hours and beyond.

The face fabric used in all examples was prepared by stitch-bonding 660 decitex textured polyester yarns into a shrinkable substrate, and shrinking the stitched fabric with heat under controlled restraint, to cause the stitched yarns to align closer to the vertical direction and to adjust the stretch properties of the fabric. Prior to lamination the post-heated fabric was approximately 2.0 mm thick, and allowed a soft stretch up to approximately 30% before the yarn network tightened and resistance to stretch increased sharply, in a manner similar to curve 600 in FIG. 4. Both the technical front and technical back of the fabric were covered by the stitched yarns. The technical front was used as the upper surface with the technical back placed underneath against the adhesive above the barrier layer.

The barrier layers used in the examples were Saranex® 553 3-mil (0.003 inch or 0.076 mm) thick co-extruded barrier film, which was stretchable by as much as 50% with full recovery, and as by much as 100% with slight deformation, in the manner of curve 700 in FIG. 4, without losing barrier properties. The break elongation of the film was well over 400% in the machine and transverse directions, as discussed in Table 1 above.

The adhesive layers deployed as described below were Dow Integral® 801 2-mil (0.002 inch or 0.05 mm) thick polyethylene low-melt films, which melt at approximately 120° C. These films also had a soft structure and a break elongations well over 400%.

The cushioning backing in all cases was a felt prepared with 15 denier polyester staple, weighing 35 ounces/yd², with an initial thickness of approximately 6 mm before lamination. The upper face of the backing placed against the lower adhesive layer could be pulled sidewise with "Velcro" tabs placed 1 inch apart and extended to approximately 2 inches before tightening, in the manner of curve 800 in FIG. 4.

Lamination was performed in a press with the gap between the platen set at 5.5 mm in all trials. The upper plate against the face layer was set at 190° C. and the lower platen at 140° C. Pressure was applied for 1 minute, and then each sample was allowed to cool before testing. This process can be converted to a continuous process using a dual belt laminator, with a gap set between the two individually heated belts, and the heating time set by the length and speed of the belts.

The physical properties of all samples were determined as follows:

Thickness, in mm, was measured with a thickness meter applying a pressure close to zero, less than 20 grams per square inch (roughly less than 0.01 psi).

Peel strength, in pounds (lbs.) of peeling force, was measured by preheating the end of a 3-inch wide sample, separating the face layer from the rest while hot, allowing the sample to cool, and pulling the partially separated layers with an increasing force until a steady separation occurred. Most separations occurred over or under the barrier, with the highest performance occurring when the barrier started to tear at random spots.

Modulus, in grams per cm of width, was measured by placing a sample 3 inches wide between jaws spaced 3-inches apart, and increasing the pulling force until the jaws were separated by approximately 8% to 3.125 inches.

Bending stiffness, in inches of bending length, was measured by projecting a 3-inch wide sample over the edge of a horizontal table and pushing it gradually beyond the edge until the tip sagged one inch over the edge of the table.

In Trials 1, 2, 3, and 4, the layers were arranged with the face fabric on top followed by a layer of adhesive, above a layer of barrier film, above a second layer of adhesive, above the backing, resulting in a "face fabric 1/adhesive 4/barrier 5/adhesive 6/backing 7" arrangement, as shown in FIG. 3. The same laminating process conditions were used in all these trials, applying heat and pressure from the top.

In Trial 1, which included the barrier layer, and yielded triplicate samples 1A, 1B, and 1C, the face fabric was pre-treated with a repellent polymer before lamination. Barrier performance was tested by dropping 100 ml of color-tinted water from a height of 1 meter through a funnel with a spout having an inside-diameter of 10 mm. With sample 1A and duplicate sample 1B, both of which are examples of the present invention, the face fabric within the impact areas became wet, but colored water stayed above the barrier. The remainder of the spilled water surprisingly stayed above the whole face fabric in all areas outside the impact area for 24 hours and beyond. Also surprisingly water placed on the composite with low impact from 12 inches and less remained on the surface, above the face fabric. Prior to barrier testing sample 1C was subjected to 25 randomly located repeated compressions within an area of 8 inches in diameter, applying 100 psi each time, using a round compression tool having a diameter of 2 cm. Sample 1C demonstrates the performance of the inventive composite with furniture placements or with wear and tear. The composite was tested within the same 8 inch area; it also passed the barrier test.

In Trial 2, which excluded the barrier layer and yielded duplicate Samples 2A and 2B representing conventional floor-coverings was prepared with face layer 1/adhesive layer 6/backing 7. The face fabric was also pretreated with a repellent polymer. Both Samples 2A and 2B failed the barrier test allowing the colored water to penetrate through the entire composite through the impact area, and eventually continuing onto the floor below the samples.

In Trial 3 the barrier layer was present but the face fabric was not treated with a polymer repellant. It yielded triplicate Samples 3A, 3B and 3C, which are further examples of the present invention. Liquid wetted the face layer and spread along the face layer without penetrating the barrier layer for 24 hrs. Barrier test results did not change with Sample 3C, which was subjected to 25 compression cycles similar to Sample 1C prior to testing.

Trial 4 yields duplicate conventional samples 4A and 4B. The face layer was not treated with a polymer repellant, and the barrier layer was omitted similar to Samples 2A and 2B. Water proceeded through to the bottom of the entire composite and onto the floor.

It is noted from the data in Table 2 that all Samples in Trials 1, 2, 3, and 4 had substantially the same physical properties, unaffected by the insertion of the thin and highly-conformable barrier layer. Surface compression under a relatively low pressure of 25 psi consistently exceeded the face layer's thickness. After being compressed to approximately one half of their overall thickness under a pressure of 100 psi, ALL samples recovered instantly. Samples held under 200 psi for 24 hours recovered their initial thickness within 10-20 minutes. Repeated compression and decompression did not affect barrier performance.

To determine the effect of a stiff/reinforcing layer inserted in lieu of or in addition to a soft barrier layer, Trials 5-7 were conducted using a sheet of glass fibers weighing 2.0 ounces per square yard, similar to the reinforcements used in prior art. These trials should be directly compared with Trial 1, since all employed a repellent-treated face fabric and the same laminating process conditions.

In Trial 5, the soft film barrier layer of Trial 1 was replaced with the glass layer, resulting in a "fabric 1/adhesive 4/glass/adhesive 6/backing 7" configuration.

In Trial 6, the adhesive layers were doubled above and below the glass web layer in an attempt to form a reinforced barrier with as much polymer as Trial 1, resulting in a "fabric 1/double adhesive 4/glass/double adhesive 6/backing 7" configuration.

In Trial 7, the glass layer was combined with the barrier film, and adhesive layers were added at all interfaces, resulting in a "fabric 1/adhesive 4/barrier film 5/adhesive 4/glass/adhesive 6/backing 7" configuration.

In Trials 5, 6 and 7, compression at low pressure failed to exceed the laminated thickness of the face layer. The Samples acquired a stiff face. Compared to Trials 1-4 the tensile modulus essentially doubled, and bending length increased by more than 20%. With the exception of Sample 7, wherein the barrier film was present along with the reinforcing layer, and wherein delamination resistance was under 1,000 g/cm, all samples from Trials 5 and 6 failed the barrier test. However, Sample 7', which was similar to Sample 7, was subjected to 25 repeated compressions similar to Sample 1C prior to barrier testing. It failed the barrier test. The glass web reinforcing layers placed within or adjacent to the barrier layer increase planar stability, but tend to reduce delamination resistance. The glass web reinforcing layer also negatively affected the barrier property of the barrier layer.

In an attempt to increase delamination resistance and avoid barrier failure, Trial 8 was conducted using the same materials as Samples 7 and 7' with the heating time increased by 50%, from 1 minute to 90 seconds. Lamination improved. Sample 8 passed the barrier test, but Sample 8', which was Sample 8 subjected to 25 compressions before testing, failed. Fibers or glass fibers from the reinforced layer can be forced into the thin and soft barrier layer and appear to have created discontinuities and stress concentrations that can cause the barrier layer to fail. Reinforced layers can only be used in the present invention, if care is taken not to negatively affect the barrier layer or if the materials from the reinforced layers don't damage the barrier layer.

TABLE 2

| Sample | Repellent treated face | Barrier layer/ Reinforced Glass | Composite Weight oz/yd$^2$ | Thickness mm | Face layer thickness | Compr. 25 psi Mm | Compr. 100 psi mm | Peel resistance grams/cm | Modulus lbs./8% | Bending length - in. | Barrier test Pass |
|---|---|---|---|---|---|---|---|---|---|---|---|
| 1A | Yes | Yes/No | 53.2 | 5.5 | 1.1 | 1.5 | 2.6 | 1198 | 62 | 12.5 | Yes |
| 1B | Yes | Yes/No | 53.0 | 5.5 | 1.2 | 1.5 | 2.4 | 1331 | 65 | 13.0 | Yes |
| 1C | Yes | Yes/No | 54.5 | 5.6 | 1.3 | 1.6 | 2.4 | 1230 | 60 | 11.3 | Yes |
| 2A | Yes | No/No | 53.3 | 5.4 | 1.2 | 1.6 | 2.6 | 1876 | 61 | 11.5 | No |
| 2B | Yes | No/No | 50.1 | 5.5 | 1.1 | 1.7 | 2.4 | 1198 | 55 | 11.0 | No |
| 3A | No | Yes/No | 52.3 | 5.4 | 1.2 | 1.6 | 2.8 | 2070 | 55 | 12.5 | Yes |
| 3B | No | Yes/No | 55.0 | 5.4 | 1.2 | 1.8 | 2.4 | 2087 | 63 | 12.5 | Yes |
| 3C | No | Yes/No | 53.6 | 5.6 | 1.4 | 1.9 | 2.7 | 1970 | 59 | 11.3 | Yes |
| 4A | No | No/No | 53.4 | 5.5 | 1.1 | 1.7 | 2.5 | 1680 | 64 | 13.0 | No |
| 4B | No | No/No | 50.3 | 5.3 | 1.1 | 1.7 | 2.7 | 1906 | 68 | 13.0 | No |
| 5 | Yes | No/Yes | 56.8 | 5.3 | 1.3 | 1.1 | 2.2 | 1250 | 129 | 16.5 | No |
| 6 | Yes | No/Yes | 58.2 | 5.6 | 1.4 | 1.1 | 2.1 | 1420 | 134 | 17.3 | No |
| 7 | Yes | Yes/Yes | 59.1 | 5.9 | 1.4 | 1.2 | 1.9 | 660 | 113 | 16.5 | Yes |
| 7' | Yes | Yes/Yes | 60.1 | 5.8 | 1.2 | 1.0 | 1.8 | 760 | 110 | 17.3 | No |
| 8 | Yes | Yes/Yes | 60.3 | 5.7 | 1.2 | 1.0 | 1.7 | 1350 | 135 | 17.5 | Yes |
| 8' | Yes | Yes/Yes | 61.4 | 6.0 | 1.2 | 1.1 | 2.0 | 1180 | 122 | 16.8 | No |

The inventive floor-covering should (i) contain spills, including spills dropped from heights of 100 cm, above or within a thin surface layer, for 24 hours, with or without treating the surface with repellent polymer finishes (ii) provide soft surface cushion equivalent to commercial/institutional textile pile floor-coverings, by allowing the surface to compress, under low pressures, beyond the limited depth of the face fabric, (iii) resist delamination/peeling and barrier failure as the floor-covering is subjected to foot traffic, the weight of static furniture, or the weight of chairs, carts, or furniture equipped with leg casters, (iv) have a durable and appealing yarn-surface that can be rated above 2.5 in a Vetterman drum test, and (v) offer the choice of a smooth or textured top surface. Preferably the floor-covering should also allow the floor underneath to release moisture, in order to prevent mold from forming between the floor and the floor-covering and allow repeated cleaning of the floor-covering without affecting its liquid-blocking capability.

The scope of this invention, should not be limited to the above examples, but should be defined by the description above and the claims below.

I claim:

1. A composite floor covering comprising:
a face layer comprising a textile fabric formed with looping yarns, an upper face, and a lower face, wherein the textile fabric can stretch planarly up to approximately 30%;
a recoverably stretchable film barrier layer having a water vapor transmission rate lower than 5 cm$^3$/m$^2$/24 hrs. and stretching by 25% to 50% without loss of barrier properties;
a flat and planar interface between the face layer and the barrier layer;
a cushion layer comprising an upper surface that can stretch from at least 25% to 50%;
a first thermoplastic adhesive layer disposed between the face layer and the barrier layer; and
a second thermoplastic adhesive layer disposed between the barrier layer and the cushion layer, the first adhesive layer and the second adhesive layer melting at a temperature substantially lower than melting temperatures of the face layer, the barrier layer and the cushion layer;
wherein following lamination of the face layer, the barrier layer, the cushion layer, the first adhesive layer and the second adhesive layer liquids spilled on the face layer are contained above the barrier layer, the composite is recoverably compressible from compression to a depth beyond a depth of the face layer under a 25 psi localized load, the barrier layer maintains its barrier properties after 25 compression cycles of a 100 psi localized load applied to the upper face of the face layer and the upper face is rated above 2.5 in a Vetterman drum test.

2. The composite floor covering of claim 1, wherein the upper face is rated above 3.5 in a Vetterman drum test.

3. The composite floor covering of claim 1, wherein barrier layer has a water vapor transmission rate of less than 3 cm$^3$/m$^2$/24 hrs.

4. The composite floor covering of claim 1, wherein the face layer is a stitch-bonded fabric comprising looping yarns stitched into a shrinkable substrate, with the yarns covering the upper face and the lower face.

5. The composite floor covering of claim 1, wherein the face layer comprises a woven fabric or knit fabric.

6. The composite floor covering of claim 1, wherein the face layer is pre-treated with a liquid repellent solution before lamination.

7. The composite floor covering of claim 6, wherein the liquid repellent solution comprises a repellant polymer.

8. The composite floor covering of claim 1, wherein the upper face of the face layer is embossed with a texture coarser and deeper than a surface texture form by the looping yarns.

9. The composite floor covering of claim 1, wherein the upper face of the composite comprises an undulating surface layer.

* * * * *